Oct. 1, 1963   J. MACK   3,105,628
FLEXIBLE PLASTIC SHOPPING BAG
Filed July 5, 1962
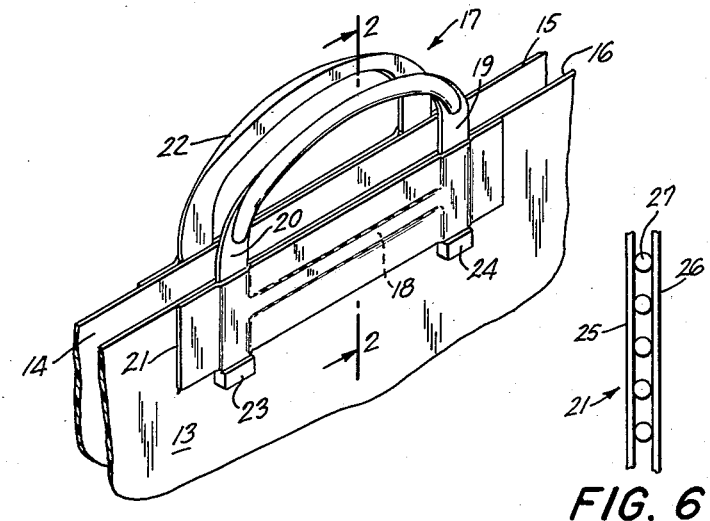
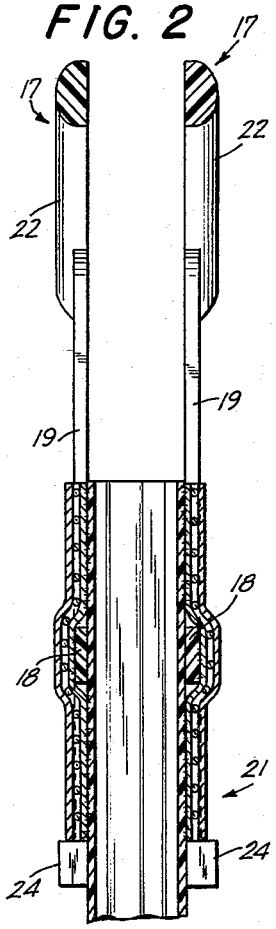
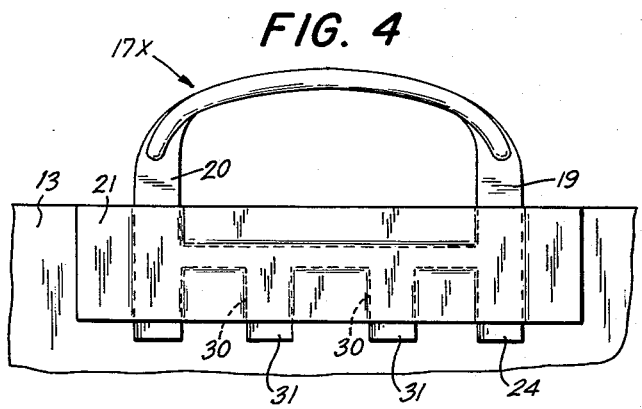
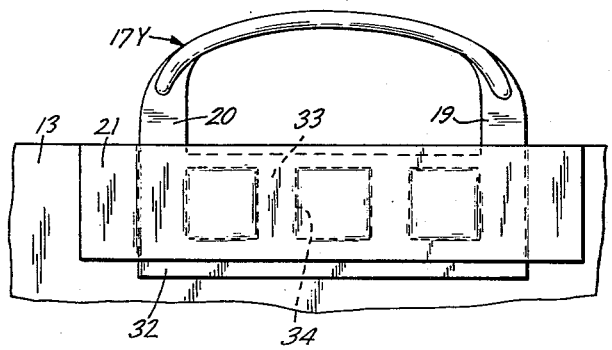
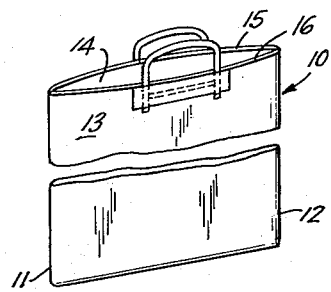

United States Patent Office 3,105,628
Patented Oct. 1, 1963

3,105,628
FLEXIBLE PLASTIC SHOPPING BAG
Joseph Mack, 444 Park Ave. S., New York, N.Y.
Filed July 5, 1962, Ser. No. 207,543
2 Claims. (Cl. 229—54)

This invention relates to shopping bags having plastic construction and more particularly to shopping bags having a flexible polyethylene plastic bag body portion secured to a plastic handle portion by means of a reinforced laminate paper tape used in conjunction with a suitable adhesive.

It is highly desirable to make a shopping bag having a body portion made of thin, strong, transparent plastic polyethylene film material. Such a bag is easily folded into a small compact package, light in weight and reuseable.

However, there is no known commercial manner of adhesively securing plastic polyethylene bag to plastic polyethylene handles.

This invention provides a solution to this problem.

It is an objective of this invention to provide a substantially all plastic shopping bag made of polyethylene plastic.

It is another object to provide a polyethylene body bag portion made of thin foldable film with semi-rigid polyethylene handles to thereby produce a shopping bag capable of supporting relatively heavy loads without tearing of the thin film material of polyethylene of which the body portion is made.

It is a further object to provide an inexpensive plastic shopping bag suitable for repeated use.

It is yet another object to provide a method of rapidly and efficiently securing handles to the body portion of a shopping bag.

These and other objects of this invention will become readily apparent upon reading the following descriptive disclosure of a plurality of illustrative embodiments of this invention taken in conjunction with the accompanying drawing in which;

FIG. 1 is a perspective view of a polyethylene bag, broken away, and showing the manner of securing separate plastic handles to the opposed bag walls, FIG. 2 is a section view taken on line 2—2 of FIG. 1 and showing in detail the construction of the adhesively secured handles and bag, FIG. 3 is a perspective view of the polyethylene plastic shopping bag, broken away in part and showing the manner of heat sealing the bag edges, FIG. 4 is a side elevation view of a modified plastic handle secured to a polyethylene bag wall by means of an adhesively secured tape, FIG. 5 is a side elevation view of another modified plastic handle, secured to a body bag portion by means of paper reinforced laminated tape with the use of suitable adhesive material, and FIG. 6 is a section view taken through a laminate reinforced tape consisting of a pair of exteriorly disposed paper sheets and a center layer of glass reinforcement fibers secured adhesively to each of said paper sheets.

In the prior art, attempts have been made to staple plastic handles to polyethylene or other plastic body portions to create shopping bags. But the use of metal staples ruptured the polyethylene film so that a shopping bag filled with material caused the film to rip or tear at the puncture.

To overcome the use of staples resort was made to heat sealing a closure directly to a plastic body portion as shown in Hayes, U.S. Patent No. 2,693,836.

But such a shopping bag as the Hayes' bag, was highly inconvenient to fill and to unload of its packages since it requires lateral movement of the closure 8 which could only be displaced at its center area a limited degree of movement.

According to the invention herein the disadvantages of the prior art are completely overcome.

Turning now to the drawing FIGS. 1 to 3 inclusive, a plastic, preferably polyethylene shopping bag 10, made of a thin longitudinal film, preferably transparent, is folded in half and heat sealed at its edges 11 and 12.

There is thereby provided a bag having opposing walls 13 and 14 and provided with a mouth having adjacent opposed edges 15 and 16.

As shown in FIG. 1 a pair of like handles 17, preferably molded and preferably made from polyethylene plastic is provided with a U-shape having an integral bridge portion 18 joining to the legs 19 and 20 thereof. The legs 19 and 20 are each suitably wide to provide good adhesive areas for a tape 21 to be secured thereto. Similarly bridge portion 18 is of suitable dimensions to permit it to be also suitably secured to tape 21 (FIG. 1).

The handles 17 are preferably each provided with a bulbous portion 22 in the curved handle carrying portion for convenience of carrying. The handles 17 are also provided at the base of each leg 19 and 20 with an integral abutment 23 and 24 against which the tape 21 is disposed.

Turning to FIG. 6, the paper laminate preferably used in this invention, is shown in cross section and consists of an exterior layer of suitably strong paper 25 and 26 disposed adhesively upon a center layer of preferably non-woven glass fibers 27 of suitable length.

A suitably long and suitably wide strip of laminate 21 is secured by means of a conventional latex adhesive composition preferably of rubber, to both the bag wall 13 and the handle leg portions 19 and 20 as well as to the handle bridge portion 18. Thus while the handle 17 is not itself directly adhesively secured to the polyethylene bag wall 13, nevertheless the handle 17 is indirectly secured by means of said tape 21. Preferably the tape top edge coincides with the top mouth edge 15 and 16.

By use of such a manner of securing a handle 17 to a polyethylene bag wall, no foci for tear are provided and the strain on the handle of a loaded shopping bag is disposed on the abutment 23 and 24 and it is also distributed over the large adhesively secured areas of the legs 19 and 20 as well as the bridge portion 18.

There is shown in FIG. 4 a modified handle 17X wherein the bridge portion 18 is provided with a plurality of supplementary spaced-apart legs 30 each having an abutment 31 at its base. This modified handle will support heavily loaded bags because of its extra supporting abutments 31 and secured leg areas 30.

Another modification of this invention is shown in FIG. 5, wherein a handle 17Y is provided with a continuous abutment rail 32 disposed between legs 19 and 20.

In this modification 17Y, the bridge portion 33 is relatively wide. This bridge portion 33 is provided with the continuous rail abutment 32 and is also preferably provided with suitably large apertures 34 through which tape 21 may be adhesively secured to the polyethylene bag wall.

The apertures 34 may be rectangular, round or otherwise, provided they are suitably large.

This invention was described above by means of several illustrative embodiments so that clearly it is of a broad scope and not limited to these illustrations.

I claim:
1. In a polyethylene shopping bag of film construction and having opposed heat sealed edges, opposed bag walls and an open mouth, the improvement comprising a pair of molded plastic integral handles disposed upon a respective bag wall adjacent the mouth; loop handle means having a pair of spaced-apart parallel disposed flat legs; each leg having an interior and an exterior wall surface, a flat bridge portion connecting the two legs, said legs each having an end abutment protruding from the exterior wall surface; fibrous flat laminate construction means disposed upon said exterior flat walls, said bridge portion and the bag wall adjacent thereto and adjacent to said abutments; and suitable latex adhesive composition securing said laminate means to said handle and to said bag wall adjacent said handle.

2. The bag of claim 1 wherein said bridge portion is apertured to permit securing of said laminate to said bag wall through said apertures.

References Cited in the file of this patent

UNITED STATES PATENTS

| | | |
|---|---|---|
| 2,693,836 | Hayes | Nov. 9, 1954 |
| 2,722,367 | Verlin | Nov. 1, 1955 |
| 2,729,055 | Tobias | Jan. 3, 1956 |
| 2,980,312 | Gould | Apr. 18, 1961 |
| 3,000,415 | Kritchever | Sept. 19, 1961 |
| 3,033,438 | Glass | May 8, 1962 |